May 5, 1925.
E. W. ABEL
1,536,598
AUTOMOBILE LICENSE PLATE FASTENER
Filed April 16, 1923
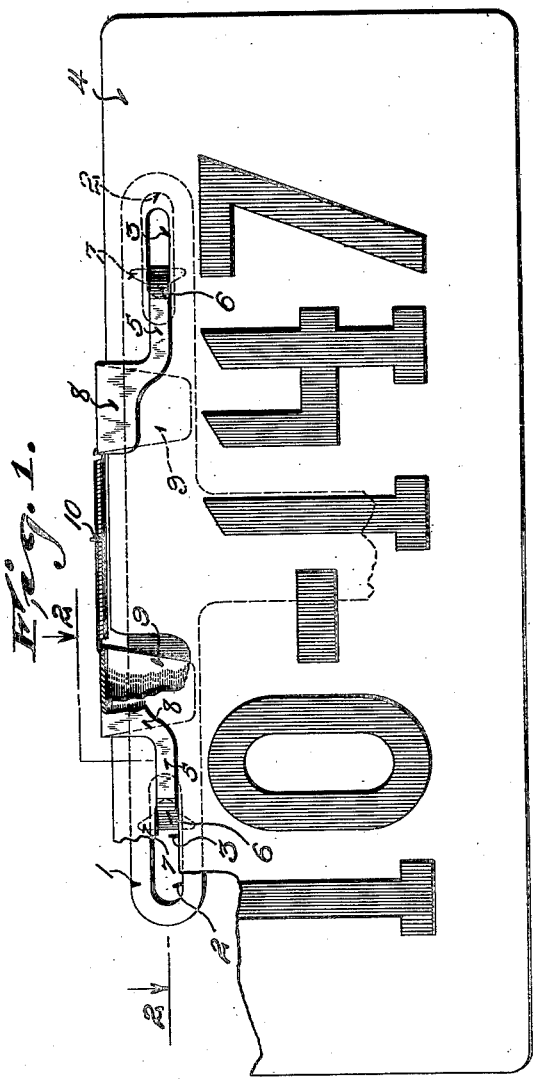
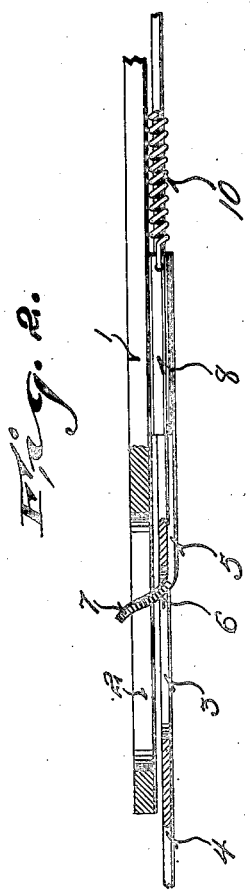

Patented May 5, 1925.

1,536,598

UNITED STATES PATENT OFFICE.

ELMER W. ABEL, OF SHEBOYGAN, WISCONSIN.

AUTOMOBILE LICENSE-PLATE FASTENER.

Application filed April 16, 1923. Serial No. 632,413.

*To all whom it may concern:*

Be it known that I, ELMER W. ABEL, a citizen of the United States, and resident of Sheboygan, in the county of Sheboygan and State of Wisconsin, have invented certain new and useful Improvements in Automobile License-Plate Fasteners; and I do hereby declare that the following is a full, clear, and exact description thereof.

This invention relates to a fastening device, and more particularly to a fastener designed to detachably connect a vehicle license plate to its supporting bracket.

At the present time practically all motor vehicles are equipped with a bracket provided with a pair of slots adapted to register with similar slots provided in the license plates for the reception of the bolts commonly used to secure the plate to the bracket. This form of attachment has many disadvantages in that the bolts and nuts readily become loosened from the vibration of the vehicle, resulting in rattling, and, in many instances, in loss of the plate. Further, in garages and other places where it is desired to frequently remove and change the plates from one vehicle to another, the operation of attaching and detaching by means of the bolts is laborious and requires considerable time.

It is, therefore, the primary object of this invention to provide a simple and inexpensive fastener which overcomes the above noted disadvantages, which allows the plate to be quickly attached or detached from the bracket by a simple operation, and which firmly secures the plate to the bracket and eliminates rattling and possible loss of the plate.

Further objects are to provide a fastener which may be readily passed through the registering slots and secured in position by a simple motion thereof, which is locked against inadvertent return to its original position, and which firmly clamps the plate and bracket.

An embodiment of the invention is shown in the accompanying drawings, in which:—

Figure 1 is an elevation of a license plate and supporting bracket secured by means of the fastener, certain parts being broken away to more clearly illustrate the construction.

Figure 2 is a sectional view on the line 2—2 of Figure 1.

The supporting bracket 1 is usually provided with aligned slots 2, which register with corresponding aligned slots 3 formed in the license plate 4, as illustrated in the drawings.

The fastener consists of a pair of members each of which comprises a strap 5, which is laterally offset or curved, as indicated at 6, and is provided with an enlarged head preferably formed by means of ears 7 which extend in normal position transversely of the slots. The portion 5 is provided with an enlarged and upwardly extending inner end which is equipped with outer and inner lips 8 and 9 respectively adapted to engage over the upper edge of the license plate, and preferably with the lip 9 positioned between the license plate and the supporting bracket. These members have their inner ends detachably joined by means of a helical spring 10 provided with hook terminals which are passed through corresponding apertures in the members.

In using this device, the spring is preferably detached from one of the members, and each member is positioned by first rotating it through substantially 90° and inserting the curved portion 6 and the terminal ears 7 through the registering slots. Thereafter the members are rocked downwardly into the position shown in Figure 1 with the lips 8 and 9 engaging over the upper edge of the license plate. The spring is then connected and tends to urge the members towards each other.

It is to be noted that the curved portion 6 acts in the manner of a cam and urges the license plate inwardly towards the supporting bracket. The lips 9 are positioned between the license plate and the bracket and cause a firm binding to occur between the parts, thereby preventing any rattling whatsoever.

It will be seen that a fastener has been provided which is eminently suitable for use in detachably connecting license plates with their supporting brackets in a rapid and efficacious manner.

It will further be seen that this device may be most cheaply manufactured, and may be sold at a very small price.

It will further be seen that a large amount of effort may be avoided where license plates are frequently changed by the use of these fasteners, and that the license plates will be securely held and loss thereof avoided.

It is obvious that various changes might be made in the exact construction illustrated, without departing from the spirit of this invention, and it is, therefore, intended that the invention is to be limited only as defined in the claims.

I claim:

1. A device for detachably locking a plate having aligned slots to a support having similar slots, said device comprising a pair of spaced members, and a spring joining said members, each of said members comprising an elongated portion having transverse ears adjacent one end adapted to be passed through a slot in said plate and a slot in said support to slidably lock when said ears are turned transversely of said slots.

2. A device for detachably connecting a plate having a pair of slots therein to a support having a similar pair of slots, said device comprising a pair of members each comprising a pair of spaced lips adapted to grip the upper edge of said plate and having an enlarged head adapted to be passed through a slot in said plate and a slot in said support, and to lock therein when said lips grip the said upper edge, and a spring resiliently urging said members towards each other.

3. The combination of a vehicle license plate having a pair of aligned slots, a holder having a pair of aligned slots adapted to register with said first mentioned slots, means for detachably fastening said plate to said holder comprising a pair of laterally curved members adapted to extend inwardly through said registering slots, ears upon the inwardly extending ends and arranged transversely of said slots, lips upon the outer ends of said members and adapted to engage the upper edge of said plate, and a spring joining the outer ends of said members.

In testimony that I claim the foregoing I have hereunto set my hand at Sheboygan, in the county of Sheboygan and State of Wisconsin.

ELMER W. ABEL.